United States Patent
Ishii et al.

(10) Patent No.: US 11,920,703 B2
(45) Date of Patent: Mar. 5, 2024

(54) THREADED CONNECTION FOR PIPES AND METHOD FOR PRODUCING THREADED CONNECTION FOR PIPES

(71) Applicants: NIPPON STEEL CORPORATION, Tokyo (JP); VALLOUREC OIL AND GAS FRANCE, Aulnoye-Aymeries (FR)

(72) Inventors: Kazuya Ishii, Tokyo (JP); Kunio Goto, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 81 days.

(21) Appl. No.: 17/758,605

(22) PCT Filed: Feb. 19, 2020

(86) PCT No.: PCT/JP2020/006435
§ 371 (c)(1),
(2) Date: Jul. 11, 2022

(87) PCT Pub. No.: WO2021/166100
PCT Pub. Date: Aug. 26, 2021

(65) Prior Publication Data
US 2023/0059150 A1  Feb. 23, 2023

(51) Int. Cl.
*F16L 58/18* (2006.01)
*F16L 15/00* (2006.01)
*E21B 17/042* (2006.01)

(52) U.S. Cl.
CPC ........... *F16L 15/006* (2013.01); *F16L 58/182* (2013.01); *E21B 17/042* (2013.01)

(58) Field of Classification Search
CPC . F16L 15/001–009; F16L 58/18; F16L 58/02; F16L 58/182
See application file for complete search history.

(56) References Cited

U.S. PATENT DOCUMENTS

| | | | |
|---|---|---|---|
| 2003/0144158 A1* | 7/2003 | Petelot | F16L 15/004 508/318 |
| 2010/0059986 A1* | 3/2010 | Kimoto | F16L 15/08 285/55 |
| 2015/0192229 A1* | 7/2015 | Goto | C10M 177/00 285/94 |
| 2015/0210888 A1* | 7/2015 | Goto | C10M 173/02 285/70 |

(Continued)

FOREIGN PATENT DOCUMENTS

| | | | |
|---|---|---|---|
| JP | 5773150 A | 5/1982 | |
| JP | 05149485 A | 6/1993 | |

(Continued)

*Primary Examiner* — Aaron M Dunwoody
(74) *Attorney, Agent, or Firm* — Greer Burns & Crain Ltd.

(57) ABSTRACT

A threaded connection for pipes according to the present embodiment includes a pin, a box, and a Zn—Ni alloy plating layer. The pin has a pin contact surface that includes an external thread part. The box has a box contact surface that includes an internal thread part. The Zn—Ni alloy plating layer is disposed on or above at least one of the pin contact surface and the box contact surface. The Zn—Ni alloy plating layer contains graphite.

17 Claims, 6 Drawing Sheets

(56) References Cited

U.S. PATENT DOCUMENTS

| | | | | |
|---|---|---|---|---|
| 2016/0208562 A1* | 7/2016 | Millet | .................... | F16B 33/008 |
| 2017/0122468 A1* | 5/2017 | Sugino | .................. | E21B 17/042 |
| 2017/0138526 A1* | 5/2017 | Goto | .................... | C10M 111/02 |
| 2018/0274703 A1* | 9/2018 | Goto | ........................ | C08K 3/04 |
| 2018/0313491 A1* | 11/2018 | Verleene | .............. | C10M 125/02 |
| 2019/0003620 A1* | 1/2019 | Goto | ....................... | C25D 7/003 |
| 2019/0010767 A1* | 1/2019 | Goto | ....................... | C25D 3/565 |
| 2019/0331262 A1* | 10/2019 | Goto | ....................... | C25D 5/12 |
| 2020/0166163 A1* | 5/2020 | Goto | ....................... | F16L 15/001 |
| 2020/0292107 A1 | 9/2020 | Oshima et al. | | |

FOREIGN PATENT DOCUMENTS

| | | | |
|---|---|---|---|
| JP | 05331694 | A | 12/1993 |
| JP | 06272791 | A | 9/1994 |
| JP | 06322557 | A | 11/1994 |
| JP | 2008214666 | A | 9/2008 |
| JP | 2017190473 | A | 10/2017 |
| JP | 2020029946 | A | 2/2020 |
| WO | 2018003455 | A1 | 1/2018 |
| WO | 2019074103 | A1 | 4/2019 |

\* cited by examiner

THREADED CONNECTION FOR PIPES AND METHOD FOR PRODUCING THREADED CONNECTION FOR PIPES

TECHNICAL FIELD

The present disclosure relates to a threaded connection for pipes and a method for producing a threaded connection for pipes.

BACKGROUND ART

For drilling an oil field or a natural gas field, oil country tubular goods (OCTG) are used. The oil country tubular goods (OCTG) are formed by connecting a plurality of pipes in proportion to the depth of a well. The pipes are connected by fastening threaded connections for pipes formed at end portions of the pipes. The oil country tubular goods are drawn up and loosened for inspection or the like, and after the inspection, fastened again and reused.

A threaded connection for pipes includes a pin and a box. The pin has a pin contact surface which includes an external thread part formed on an outer peripheral surface of an end portion of a pipe. The pin contact surface may include a pin metal seal part and a pin shoulder part. The box has a box contact surface which includes an internal thread part formed on an inner peripheral surface of an end portion of a pipe. The box contact surface may include a box metal seal part and a box shoulder part. Hereunder, the pin contact surface and the box contact surface are simply referred to as "contact surface".

In fastening the pipes, the pin contact surface and the box contact surface are brought into contact with each other. Accordingly, the pin contact surface and the box contact surface are repeatedly subjected to strong friction in fastening and loosening the pipes. When the fastening and loosening are repeated and if these regions have no sufficient durability against friction, galling (unrepairable seizure) occurs. Therefore, threaded connections for pipes are required to have a sufficient durability against friction, namely, an excellent galling resistance.

To enhance the galling resistance, a compound grease that contains heavy metal has been used in conventional practice. By applying the compound grease on a surface of a threaded connection for pipes, the galling resistance of the threaded connection for pipes can be increased. However, heavy metals such as Pb contained in the compound grease may have an influence on an environment. For this reason, there is a demand for developing a threaded connection for pipes that does not need the compound grease.

A technique relating to a threaded connection for pipes that has an excellent galling resistance is proposed in Japanese Patent Application Publication No. 05-149485 (Patent Literature 1). The threaded connection for pipes disclosed in Patent Literature 1 forms a dispersed plating layer on a surface of a pin or a box, and in the dispersed plating layer, one or more kinds of non-metallic phases and an additional metallic phase are dispersed and caused to be eutectoid in a metal matrix. Patent Literature 1 discloses that this provides a threaded connection for pipes that has an excellent galling resistance even in fastening and loosening using a compound grease containing no heavy metal component.

There are studies including Patent Literature 1 for enhancing slidability by dispersing a non-metallic material in a plating layer so as to enhance a galling resistance or decrease a coefficient of friction. Specifically, Japanese Patent Application Publication No. 2008-214666 (Patent Literature 2) proposes a threaded connection for pipes enhanced a galling resistance to disperse a non-metallic material in a plating layer.

A threaded connection for pipes disclosed in Patent Literature 2 forms a low-frictional composite coating layer on a surface of a base material, and the low-frictional composite coating layer contains a carbon-nano material and a zinc component. Patent Literature 2 discloses that this provides a threaded connection for pipes that is excellent in low-frictional properties under heavy loads and so excellent in fastening properties as to enable the thread member to withstand harsh environments.

CITATION LIST

Patent Literature

Patent Literature 1: Japanese Patent Application Publication No. 05-149485

Patent Literature 2: Japanese Patent Application Publication No. 2008-214666

SUMMARY OF INVENTION

Technical Problem

Meanwhile, for the purpose of increasing a mining recovery of oil or natural gas, the deepening of oil wells has proceeded. In addition to increase in depths of oil wells, a future increase in horizontal wells is expected. The horizontal well refers to a well drilled vertically down to a stratum in which oil or natural gas is buried (oil stratum), and then drilled in a horizontal direction or a direction inclining from the horizontal direction along the oil stratum. Recent years have seen a tendency of horizontal wells to increase in lengths of horizontal portions thereof. In a horizontal well, a route of the well changes from a vertical direction to the horizontal direction in the middle of the well. Therefore, in a bent portion where the route of the well changes from the vertical direction to the horizontal direction, a high stress is applied to entire oil country tubular goods. Therefore, a high stress is also applied to a threaded connection for pipes in the bent portion. Moreover, in drilling operation of a horizontal well, it is necessary to push the oil country tubular goods into the well while rotating the oil country tubular goods in a circumferential direction. When rotated under a high stress, the threaded connection for pipes is likely to loosen. A loosened threaded connection for pipes leads to a reduction in airtightness of the oil country tubular goods. For that reason, the threaded connection for pipes is required to be likely to hard to loosen even in a horizontal well.

By the techniques disclosed in Patent Literature 1 or 2, a galling resistance of a threaded connection for pipes can be increased. However, in Patent Literature 1 or 2, there is no mention about the making less of looseness of a threaded connection for pipes even if that is used for a horizontal well.

An objective of the present disclosure is to provide a threaded connection for pipes having an excellent galling resistance and being capable of preventing looseness even when used for a horizontal well, and to provide a method for producing the threaded connection for pipes.

Solution to Problem

A threaded connection for pipes according to the present disclosure includes a pin, a box, and a Zn—Ni alloy plating layer. The pin has a pin contact surface that includes an external thread part. The box has a box contact surface that includes an internal thread part. The Zn—Ni alloy plating layer is disposed on or above at least one of the pin contact surface and the box contact surface. The Zn—Ni alloy plating layer contains graphite.

A method for producing the threaded connection for pipes according to the present disclosure includes a preparing step and a plating layer forming step. In the preparing step, a pin, a box, and a plating solution are prepared. The pin has a pin contact surface that includes an external thread part. The box has a box contact surface that includes an internal thread part. The plating solution contains a zinc ion, a nickel ion, and graphite. In the plating layer forming step, at least one of the pin contact surface and the box contact surface is brought into contact with the plating solution and subjected to electroplating, by which a Zn—Ni alloy plating layer is formed on at least one of the pin contact surface and the box contact surface.

Advantageous Effects of Invention

The threaded connection for pipes according to the present disclosure has an excellent galling resistance and is capable of suppressing looseness when used in a horizontal well. The method for producing the threaded connection for pipes according to the present disclosure can produce the threaded connection for pipes described above.

DESCRIPTION OF EMBODIMENTS

The present embodiment will be described below in detail with reference to the accompanying drawings. The same or equivalent portions will be denoted by the same reference numerals, and description of the portions will not be repeated.

The present inventors first focused their attention on a coefficient of friction, and conducted studies about a galling resistance and looseness of a threaded connection for pipes, the looseness occurring when the threaded connection for pipes is used in a horizontal well. As a result, the following findings were obtained.

A threaded connection for pipes is fastened and loosened with a given torque. In the fastening and loosening, as described above, a pin contact surfaces and a box contact surface slide on each other with a high interfacial pressure of, for example, 1.0 GPa or more applied to the contact surfaces. In other words, the contact surfaces receive a strong friction in the fastening and the loosening. Accordingly, when a coefficient of friction between the contact surfaces is high, frictional heat generated in the fastening and the loosening increases, which easily causes adhesion or galling. In contact between metals, the galling is remarkably likely to occur when a coefficient of friction between the metals is, for example, more than 0.4. For that reason, in conventional practice, reduction of a coefficient of friction between contact surfaces has been attempted by applying a lubricating agent or by forming a plating layer having a low coefficient of friction on the contact surfaces. For example, when a conventional API dope is used, the coefficient of friction of the contact surfaces becomes about 0.05 to 0.2. In this case, the galling of the contact surfaces becomes suppresses.

Meanwhile, the present inventors have found that decreasing a coefficient of friction makes the threaded connection for pipes easy to loosen. A torque required in fastening and loosening is in a proportional relationship with a coefficient of friction between contact surfaces. Specifically, the higher the coefficient of friction between contact surfaces is, the higher the torque in fastening and loosening is. A threaded connection for pipes that is insusceptible to looseness can be obtained if the threaded connection for pipes maintains a high torque in loosening. Hereafter, a capability to maintain a high torque in loosening will be referred to as a high-torque maintenance property.

Accordingly, when the coefficient of friction is decreased, although the galling resistance of the threaded connection for pipes is increased, the threaded connection for pipes is likely to easy to loosen. Meanwhile, when the coefficient of friction is increased, although the looseness of the threaded connection for pipes is suppressed, the galling resistance of the threaded connection for pipes is decreased. As described, for the threaded connection for pipes, it has been considered to be difficult to obtain both the excellent galling resistance and the high-torque maintenance property.

Meanwhile, as a result of detailed studies of the present inventors, it became clear that in a case where a specified plating formed on or above the contact surfaces contains graphite, the galling resistance of the threaded connection for pipes is increased and further the high-torque maintenance property is increased. In this regard, it will be described in detail with reference to the drawing.

Figure 1:
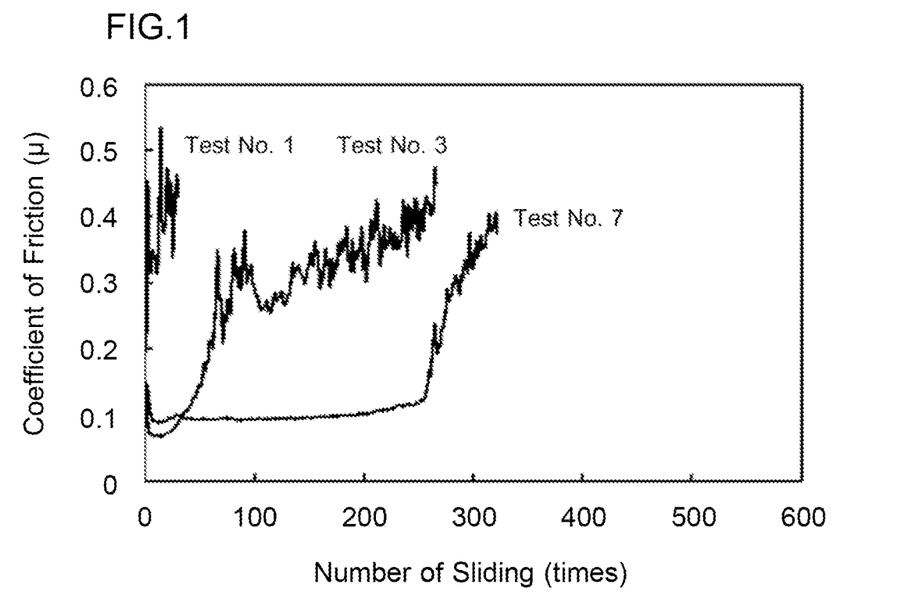
FIG. 1 is a diagram illustrating results of Bowden sliding test performed on Test Nos. 1, 3, and 7 in Example.

FIG. 1 is a diagram illustrating a part of results of Bowden sliding test performed in Example. Referring to FIG. 1, Test No. 1 indicates a result of which a Zn—Ni alloy plating layer containing no graphite is subjected to Bowden sliding test. Test No. 3 indicates a result of which a Zn—Ni alloy plating layer containing graphite is subjected to Bowden sliding test. Test No. 7 indicates a result of which a Cu plating layer containing graphite to subjected to Bowden sliding test.

Referring to Test No. 1 and Test No. 3 in FIG. 1, the number of sliding until a coefficient of friction became more than 0.4 of a Zn—Ni alloy plating layer containing graphite (Test No. 3) is greater than that of a Zn—Ni alloy plating layer containing no graphite (Test No. 1). As described above, for the threaded connection for pipes, when the coefficient of friction became more than 0.4, the galling is remarkably likely to occur. Accordingly, FIG. 1 indicates that the galling resistance of Zn—Ni alloy plating layer increased by containing graphite.

Further, referring to Test No. 3 in FIG. 1, in the Zn—Ni alloy plating layer containing graphite, a high coefficient of friction became more than 0.2 after the number of sliding was over 50 times. As a result of continued sliding, the coefficient of friction became more than 0.4 after the number of sliding was over 200 times. Accordingly, in the Zn—Ni alloy plating layer containing graphite, the coefficient of friction about 0.2 to 0.4 was maintained during 150 times at the number of sliding. In short, in the Zn—Ni alloy plating layer containing graphite, the number of sliding until the galling was occurred was large, and further, the number of sliding during the high coefficient of friction was large. Therefore, it became clear that the Zn—Ni alloy plating layer containing graphite is capable to achieve both the excellent galling resistance and the high-torque maintenance property.

Meanwhile, referring to Test No. 7 in FIG. 1, in the Cu plating layer containing graphite, a coefficient of friction indicated about 0.1 until the number of sliding was over 250 times. As a result of continued sliding, the coefficient of friction became more than 0.4 at a stroke after the number of sliding was over 300 times. Accordingly, in the Cu plating layer containing graphite, the number of sliding during the coefficient of friction maintained about 0.2 to 0.4 was small.

Therefore, the Cu plating layer containing graphite had the excellent galling resistance and did not indicate the high-torque maintenance property.

As described above, as a result of detailed studies of the present inventors, it became clear that both the galling resistance and the high-torque maintenance property of the threaded connection for pipes are increased as a result from containing graphite to the specified plating, that is, the Zn—Ni alloy plating layer formed on or above the contact surfaces. Meanwhile, the detailed reason both the galling resistance and the high-torque maintenance property of the threaded connection for pipes are increased when the Zn—Ni alloy plating layer contains graphite has not been clarified. The present inventors are considering that the reason for this as follows.

Zn—Ni alloy plating has a high hardness as compared with conventional Cu plating. The higher the hardness, the higher the resistance is generated against a stress that is applied in sliding in fastening at a remarkably high interfacial pressure (e.g., 1.0 GPa or more). In addition, in Example described later, for the Test Nos. in which the coefficient of friction has become more than 0.4 at the Bowden sliding test, it was verified that the plating layers were peeled off from the steel sheet for each Test No. after the Bowden sliding test. Meanwhile, in the Zn—Ni alloy plating layers containing graphite (Test Nos. 2 to 5), the remained amount of the plating layer was larger than that of the Zn—Ni alloy plating layers containing no graphite (Test No. 1). Accordingly, in the Zn—Ni alloy plating layer, graphite may possibly prevent the Zn—Ni alloy plating layer from being peeled off.

Therefore, in the Zn—Ni alloy plating layer, the present inventors presume that the coefficient of friction is increased by being peeled off the part of the plating layer according to the number of sliding. In the Zn—Ni alloy plating layer partially peeled, it is considered that the coefficient of friction increases to a range of 0.2 to 0.4. Further, by the Zn—Ni alloy plating layer contains graphite, peeling of the Zn—Ni alloy plating layer is suppressed, so as to the coefficient of friction may possibly maintain within a range of 0.2 to 0.4. Furthermore, this tendency is not confirmed in the Cu plating layer containing graphite. Therefore, the effect of which graphite prevents the plating layer from being peeled off so as to the coefficient of friction maintains within a range of 0.2 to 0.4 is typical of the Zn—Ni alloy plating layer.

By the aforementioned mechanism, the present inventors is considering that the threaded connection for pipes having the Zn—Ni alloy plating layer containing graphite achieve both the excellent galling resistance and the increased high-torque maintenance property. Note that, by a mechanism different from the aforementioned mechanism, there is a possibility that the Zn—Ni alloy plating layer containing graphite enhances the galling resistance and the high-torque maintenance property of the threaded connection for pipes. However, it has been proved by Examples described later that the threaded connection for pipes can achieve both the excellent galling resistance and the excellent high-torque maintenance property by containing graphite in the Zn—Ni alloy plating layer.

The threaded connection for pipes according to the present embodiment, which has been completed based on the above findings, includes a pin, a box, and a Zn—Ni alloy plating layer. The pin has a pin contact surface that includes an external thread part. The box has a box contact surface that includes an internal thread part. The Zn—Ni alloy plating layer is disposed on or above at least one of the pin contact surface and the box contact surface. The Zn—Ni alloy plating layer contains graphite.

The threaded connection for pipes according to the present embodiment includes the Zn—Ni alloy plating layer containing graphite. Therefore, the threaded connection for pipes according to the present embodiment has an excellent galling resistance and an excellent high-torque maintenance property. Therefore, the threaded connection for pipes has an excellent galling resistance and is likely to hard to loosen even when used for a horizontal well. A plating layer made of a Zn—Ni alloy, graphite, and impurities will be herein referred to as a Zn—Ni alloy plating layer.

Preferably, when a content of a whole chemical composition of the Zn—Ni alloy plating layer is 100.0 at %, a Ni content in the Zn—Ni alloy plating layer is 5.0 to 35.0 at %.

In this case, a hardness of the Zn—Ni alloy plating layer is increased.

Preferably, when the content of the whole chemical composition of the Zn—Ni alloy plating layer is 100.0 at %, a graphite content in the Zn—Ni alloy plating layer is 30.0 to 60.0 at %.

In this case, the high-torque maintenance property is further increased, making the threaded connection for pipes further insusceptible to looseness even when used for a horizontal well.

The Zn—Ni alloy plating layer described above may have a thickness of 1.0 to 50.0 μm.

Preferably, the threaded connection for pipes may further include a lubricating coating on or above one or more surface selected from the group consisting of the pin contact surface, the box contact surface, and the Zn—Ni alloy plating layer.

In this case, a lubricity of the threaded connection for pipes is increased.

A method for producing the threaded connection for pipes according to the present embodiment includes a preparing step and a plating layer forming step. In the preparing step, a pin, a box, and a plating solution are prepared. The pin has a pin contact surface that includes an external thread part. The box has a box contact surface that includes an internal thread part. The plating solution contains a zinc ion, a nickel ion, and graphite. In the plating layer forming step, at least one of the pin contact surface and the box contact surface is brought into contact with the plating solution, so as to form a Zn—Ni alloy plating layer on at least one of the pin contact surface and the box contact surface by electrolytic plating.

The threaded connection for pipes according to the present embodiment and a method for producing the threaded connection for pipes will be described below in detail. In the following description, at % refers to the atomic percent.

[Threaded Connection for Pipes]

Figure 2:
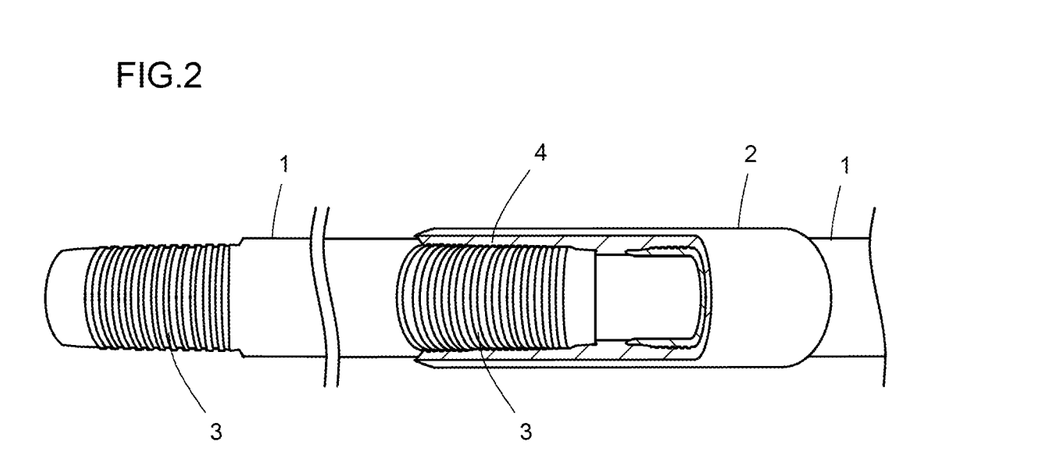
FIG. 2 is a diagram illustrating a configuration of an example of a threaded connection for pipes of a coupling type.

A threaded connection for pipes includes a threaded connection for pipes of a coupling type and a threaded connection for pipes of an integral type. FIG. 2 is a diagram illustrating a configuration of a threaded connection for pipes of a coupling type. Referring to FIG. 2, the threaded connection for pipes includes a pipe 1 and a coupling 2. At both ends of the pipe 1, pins 3 each including an external thread part on its outer surface are formed. At both ends of the coupling 2, boxes 4 having internal thread parts on their inner surfaces are formed. By fastening the pin 3 and the box 4, the coupling 2 is attached to an end of the pipe 1.

Figure 3:
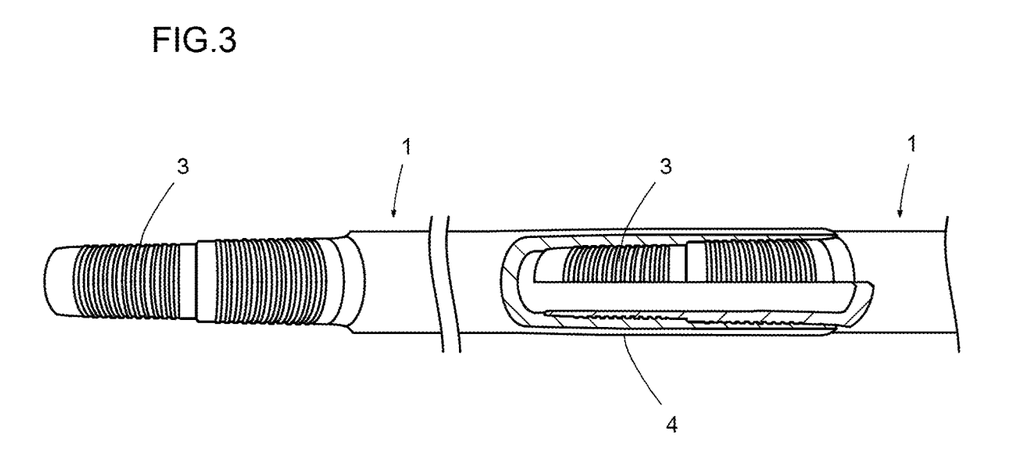
FIG. 3 is a diagram illustrating a configuration of an example of a threaded connection for pipes of an integral type.

FIG. 3 is a diagram illustrating a configuration of a threaded connection for pipes of an integral type. Referring to FIG. 3, the threaded connection for pipes includes a pipe 1. At one end of the pipe 1, a pin 3 including an external thread part on its outer surface is formed. At the other end of the pipe 1, a box 4 including an internal thread part on its inner surface is formed. By fastening the pin 3 and the box 4, pipes 1 can be connected together. The threaded connection for pipes according to the present embodiment is available for both of a threaded connection for pipe or tube of a coupling type and a threaded connection for pipes of an integral type.

Figure 4:
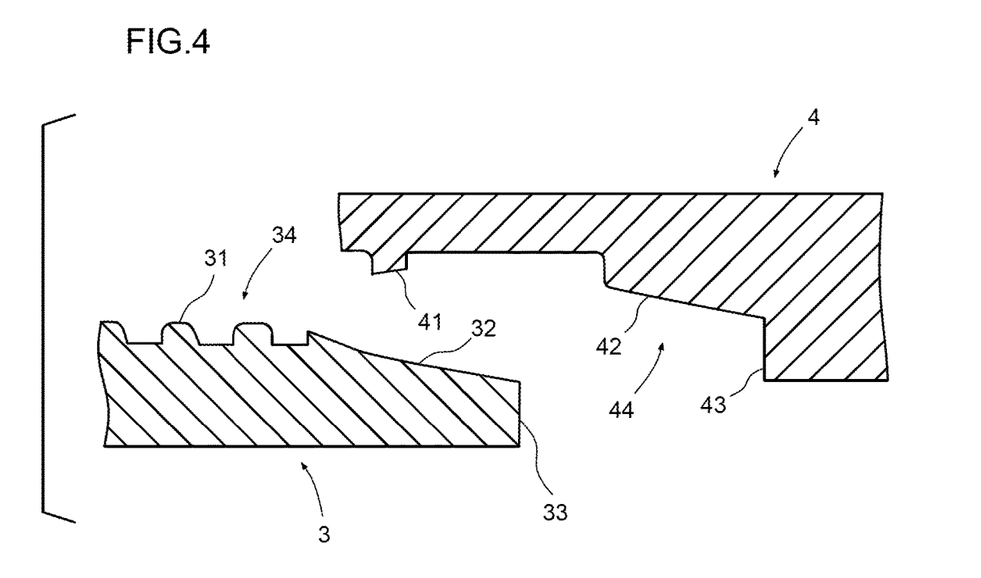
FIG. 4 is a sectional view of an example of a threaded connection for pipes.

Parts that come into contact with each other when the pin 3 and the box 4 are fastened are referred to as a pin contact surface 34 and a box contact surface 44. FIG. 4 is a sectional view of an example of the threaded connection for pipes. In the example of the threaded connection for pipes illustrated in FIG. 4, the pin 3 includes an external thread part 31, a pin metal seal part 32, and a pin shoulder part 33. The box 4 includes an internal thread part 41, a box metal seal part 42, and a box shoulder part 43.

When the pin 3 and the box 4 are fastened, the thread parts (the external thread part 31 and the internal thread part 41) come into contact with each other, the metal seal parts (the pin metal seal part 32 and the box metal seal part 42) come into contact with each other, and the shoulder parts (the pin shoulder part 33 and the box shoulder part 43) come into contact with each other. In other words, when the pin contact surface 34 includes the external thread part 31, the pin metal seal part 32, and the pin shoulder part 33, the box contact surface 44 includes the internal thread part 41, the box metal seal part 42, and the box shoulder part 43. Note that, the threaded connection for pipes according to the present embodiment does not have to include the metal seal part and the shoulder part as long as that includes the thread part.

In short, the pin 3 has the pin contact surface 34 that includes the external thread part 31. As described above, the pin contact surface 34 may further include the pin metal seal part 32 and the pin shoulder part 33. Therefore, the pin contact surface 34 may not include the pin metal seal part 32 and the pin shoulder part 33 as long as that includes the external thread part 31. The pin contact surface 34 may include the external thread part 31 and the pin metal seal part 32, may include the external thread part 31 and pin shoulder part 33, or may include the external thread part 31, the pin metal seal part 32 and pin shoulder part 33.

Also, the box 4 has the box contact surface 44 that includes the internal thread part 41. As described above, the box contact surface 44 may further include the box metal seal part 42 and the box shoulder part 43. Therefore, the box contact surface 44 may not include the box metal seal part 42 and the box shoulder part 43 as long as that includes the internal thread part 41. The box contact surface 44 may include the internal thread part 41 and the box metal seal part 42, may include the internal thread part 41 and box shoulder part 43, or may include the internal thread part 41, the box metal seal part 42 and box shoulder part 43.

Hereinafter, the case where the pin contact surface 34 includes the external thread part 31, the pin metal seal part 32 and the pin shoulder part 33, and the box contact surface 44 includes the internal thread part 41, the box metal seal part 42 and the box shoulder part 43 as one example of the threaded connection for pipes according to the present embodiment will be described.

In the threaded connection for pipes including the metal seal parts and the shoulder parts, the disposition of the thread parts, the metal seal parts and the shoulder parts is not particularly limited. Specifically, in FIG. 4, on the pin 3, the pin shoulder part 33, the pin metal seal part 32, and the external thread part 31 are disposed in this order from an end of the pipe 1. Further, in FIG. 4, on the box 4, the internal thread part 41, the box metal seal part 42, and the box shoulder part 43 are disposed in this order from an end of the pipe 1 or the coupling 2. Meanwhile, the disposition of these is not limited to the disposition illustrated in FIG. 4 and can be changed as appropriate.

For example, as illustrated in FIG. 3, the external thread part, the pin metal seal part, the pin shoulder part, the pin metal seal part, and the external thread part may be disposed on the pin 3 in this order from an end of the pipe 1. In a similar manner, on the box 4, the internal thread part, the box metal seal part, the box shoulder part, the box metal seal part, and the internal thread part may be disposed in this order from an end of the pipe 1 or the coupling 2.

Therefore, the pin contact surface 34 of the pin 3 may include a plurality of the external thread parts 31, may include a plurality of the pin metal seal parts 32 and may include a plurality of the pin shoulder parts 33. In a similar manner, the box contact surface 44 of the box 4 may include a plurality of the internal thread parts 41, may include a plurality of the box metal seal parts 42 and the box shoulder parts 43.

[Zn—Ni Alloy Plating Layer]

The threaded connection for pipes according to the present embodiment includes the pin 3, box 4, and a Zn—Ni alloy plating layer. The Zn—Ni alloy plating layer is disposed on or above at least one of the pin contact surface 34 and the box contact surface 44.

Figure 5:
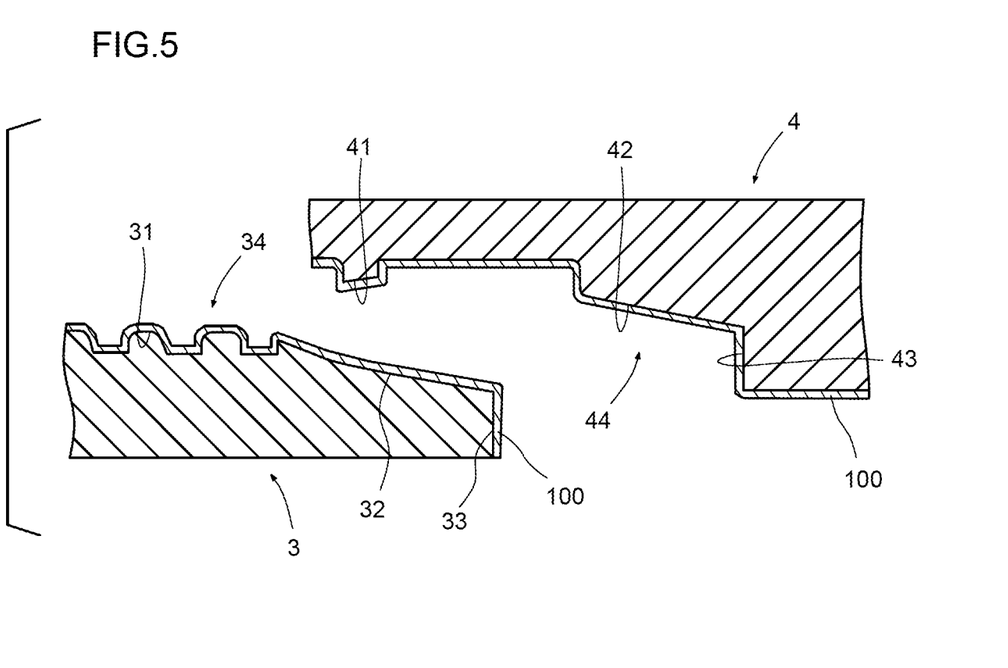
FIG. 5 is a sectional view of an example of a threaded connection for pipes according to the present embodiment.
Figure 6:
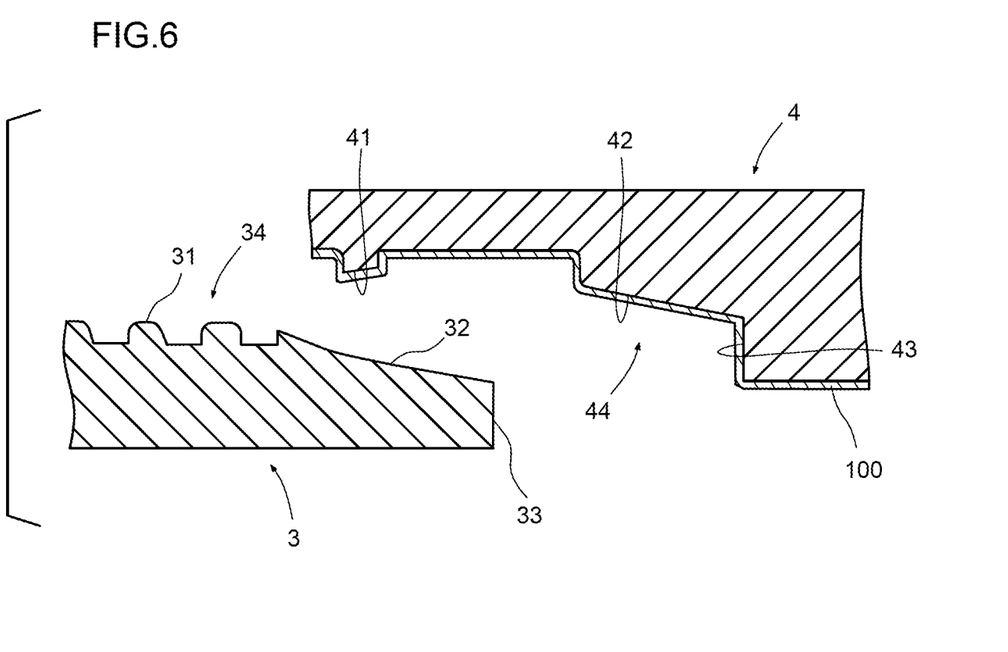
FIG. 6 is a sectional view of an example of a threaded connection for pipes according to another embodiment, the threaded connection for pipes being different from the threaded connection for pipes illustrated in FIG. 5.
Figure 7:
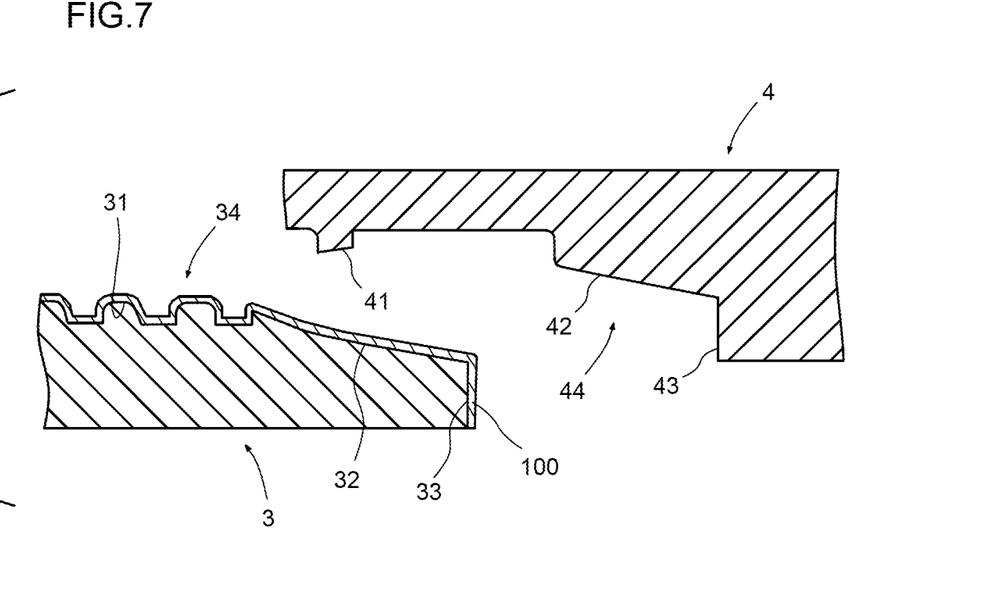
FIG. 7 is a sectional view of an example of a threaded connection for pipes according to still another embodiment, the threaded connection for pipes being different from the threaded connections for pipes illustrated in FIG. 5 and FIG. 6.

FIG. 5 is a sectional view of an example of the threaded connection for pipes according to the present embodiment. Referring to FIG. 5, the Zn—Ni alloy plating layers 100 is disposed on both the pin contact surface 34 and the box contact surface 44. FIG. 6 is a sectional view of an example of the threaded connection for pipes according to another embodiment, the threaded connection for pipes being different from the threaded connection for pipes illustrated in FIG. 5. Referring to FIG. 6, the Zn—Ni alloy plating layers 100 may be disposed only on the box contact surface 44. FIG. 7 is a sectional view of an example of the threaded connection for pipes according to still another embodiment, the threaded connection for pipes being different from the threaded connections for pipes illustrated in FIG. 5 and FIG. 6. Referring to FIG. 7, the Zn—Ni alloy plating layers 100 may be disposed only on the pin contact surface 34.

The Zn—Ni alloy plating layer 100 has to be disposed on or above at least one of the pin contact surface 34 and the box contact surface 44. Further, the Zn—Ni alloy plating layer 100 may be disposed on or above either the whole or a part of at least one of the pin contact surfaces 34 and the box contact surface 44. Specifically, the pin metal seal part 32 and the box metal seal part 42, and the pin shoulder part 33 and the box shoulder part 43 are under a high interfacial pressure particularly in a final phase of fastening. Therefore, in a case where the threaded connection for pipes includes the pin metal seal part 32, the box metal seal part 42, the pin shoulder part 33 and the box shoulder part 43, the Zn—Ni alloy plating layer 100 may be disposed on or above at least one of the pin metal seal part 32, the box metal seal part 42, the pin shoulder part 33, and the box shoulder part 43. In contrast, in a case where Zn—Ni alloy plating layer 100 is disposed entirely on or above at least one of the contact surfaces 34 and 44, a production efficiency of the threaded connection for pipes is increased.

As described above, the Zn—Ni alloy plating layer 100 is made of a Zn—Ni alloy, graphite, and impurities. Here, the Zn—Ni alloy contains zinc (Zn) and nickel (Ni). Also, the Zn—Ni alloy may contain impurities. Here, the impurities of the Zn—Ni alloy plating layer 100 and the impurities of the Zn—Ni alloy mean substances that are other than Zn, Ni and graphite, contained in the Zn—Ni alloy plating layer 100 or the Zn—Ni alloy during production of the threaded connection for pipes, and contained at contents within ranges within which the impurities have no influence on effects of the present disclosure.

The Ni content in the Zn—Ni alloy plating layer 100 is not limited to a specific content. However, when the content of the whole chemical composition of the Zn—Ni alloy plating layer 100 is assumed to be 100.0 at %, the Ni content in the Zn—Ni alloy plating layer 100 of 5.0 to 35.0 at % causes a hardness of the Zn—Ni alloy plating layer 100 to increase.

Therefore, when the content of the whole chemical composition of the Zn—Ni alloy plating layer 100 is assumed to be 100.0 at %, the Zn—Ni alloy plating layer 100 preferably contains 5.0 to 35.0 at % of Ni. A lower limit of the Ni content in the Zn—Ni alloy plating layer 100 is more preferably 10.0 at %. An upper limit of the Ni content in the Zn—Ni alloy plating layer 100 is more preferably 30.0 at %.

Note that, Zinc (Zn) contained in the Zn—Ni alloy plating layer 100 is a base metal in comparison with iron (Fe), which is a principal component of the pipe. Zn therefore has an effect of sacrificial protection, increasing a corrosion resistance of the threaded connection for pipes.

[Graphite]

Graphite is a substance formed of layered sheets (graphenes), each of which is a hexagonal lattice to which carbon atoms are coupled. Graphite contains carbon (C), and its balance consists of impurities. Since a bonding strength between layers in graphene is weak, graphenes are prone to be peeled off from their layers. For that reason, graphite is generally used as a lubricating agent. However, according to the present embodiment, the Zn—Ni alloy plating layer 100 containing graphite increases the galling resistance and increases the high-torque maintenance property of the threaded connection for pipes. As a result, the threaded connection for pipes is capable of preventing looseness even when used for a horizontal well.

[Graphite Content]

The graphite content in the Zn—Ni alloy plating layer 100 is not limited to a specific content. However, when the content of the whole chemical composition of the Zn—Ni alloy plating layer 100 is assumed to be 100.0 at %, 30.0 at % or more of graphite content further increases the high-torque maintenance property of the Zn—Ni alloy plating layer 100. In this case, looseness of a threaded connection for pipes is further suppressed even when the threaded connection for pipes is used in a horizontal well. In contrast, when the content of the whole chemical composition of the Zn—Ni alloy plating layer 100 is assumed to be 100.0 at %, a normal Zn—Ni alloy plating layer 100 can be formed in a stable manner when the graphite content is 60.0 at % or less. Therefore, when the content of the whole chemical composition of the Zn—Ni alloy plating layer 100 is assumed to be 100.0 at %, the graphite content in the Zn—Ni alloy plating layer 100 is preferably 30.0 to 60.0 at %. A lower limit of the graphite content in the Zn—Ni alloy plating layer 100 is more preferably 40.0 at %. An upper limit of the graphite content in the Zn—Ni alloy plating layer 100 is more preferably 55.0 at %.

[Method for Measuring Ni Content and Graphite Content in Zn—Ni Alloy Plating Layer]

The Ni content and the graphite content in the Zn—Ni alloy plating layer 100 can be measured by the following method. First, a sample of a threaded connection for pipes on or above which the Zn—Ni alloy plating layer 100 is formed is prepared. A surface of the Zn—Ni alloy plating layer 100 as the sample is subjected to elemental analysis by EDS (Energy Dispersive X-ray Spectroscopy) using an electron probe micro analyzer (FE-EPMA: JXA-8530F from JEOL Ltd.). The sample is irradiated with an electron beam at accelerating voltage: 15 to 30 kV and irradiation current: 1 nA at its maximum, and X-ray strengths including C-kα line, Zn-kα line, and Ni-kα line are measured with a measurement magnification of 1500× to 5000×. Based on the X-ray strengths of the respective elements, a C content (at %), a Zn content (at %), and an Ni content (at %) are calculated. A value obtained by dividing the Ni content by a total content of C, Zn, and Ni is defined as the Ni content (at %). A value obtained by dividing the C content by the total content of C, Zn, and Ni is defined as the graphite content (at %). The elemental analysis is performed at given three spots on the surface of the Zn—Ni alloy plating layer 100, and averages of the obtained contents are used.

[Thickness of Zn—Ni Alloy Plating Layer]

A thickness of the Zn—Ni alloy plating layer 100 is not limited to a specified thickness. The thickness of the Zn—Ni alloy plating layer 100 is, for example, 1.0 to 50.0 μm. When the thickness of the Zn—Ni alloy plating layer 100 is 1.0 μm or more, a sufficient galling resistance can be obtained stably. Even if the thickness of the Zn—Ni alloy plating layer 100 becomes more than 50.0 μm, the above effect saturates. Therefore, the thickness of the Zn—Ni alloy plating layer 100 is preferably 1.0 to 50.0 μm. An upper limit of the thickness of the Zn—Ni alloy plating layer 100 is more preferably 20.0 μm.

[Method for Measuring Thickness of Zn—Ni Alloy Plating Layer]

The thickness of the Zn—Ni alloy plating layer 100 can be measured by the following method. The thickness of the Zn—Ni alloy plating layer 100 is measured at arbitrary four spots on each of the pin contact surface 34 or the box contact surface 44 on or above which the Zn—Ni alloy plating layer 100 is formed, using PHASCOPE PMP10, a phase-sensitive eddy-current thicknessmeter from Helmut Fischer GmbH. The measurement is performed according to a method that conforms to International Organization for Standardization (ISO) 21968(2005). The spots of the measurement are four spots on the threaded connection for pipes in a tube circumferential direction (the four spots including 0°, 90°, 180°, and 270°). An arithmetic mean value of results of the measurement is determined as the thickness of the Zn—Ni alloy plating layer 100.

[Vickers Hardness of Zn—Ni Alloy Plating Layer]

The galling resistance of the threaded connection for pipes increases as a hardness of the Zn—Ni alloy plating layer 100 increases. Therefore, a lower limit of a Vickers hardness Hv of the Zn—Ni alloy plating layer 100 is preferably 150, more preferably 250. An upper limit of the Vickers hardness Hv of the Zn—Ni alloy plating layer 100 is preferably made as high as possible. The upper limit of the Vickers hardness Hv of the Zn—Ni alloy plating layer 100 is, for example, 600.

[Method for Measuring Vickers Hardness of Zn—Ni Alloy Plating Layer]

The Vickers hardness of the Zn—Ni alloy plating layer 100 can be measured by the following method. A pin 3 or a box 4 that includes the Zn—Ni alloy plating layer 100 is prepared. The pin 3 or the box 4 including the Zn—Ni alloy plating layer 100 is cut in a direction perpendicular to its axial direction. At given five points on an exposed cross section of the Zn—Ni alloy plating layer 100, Vickers hardnesses are measured by a method that conforms to JIS Z2244(2009). In the measurement, a micro hardness tester Fischer scope HM2000 from Fischer Instruments K. K is used. A test temperature is set at a normal temperature (25° C.), and a test force (F) is set at 5 to 100 mN. From five results obtained by the measurement, their maximum value and minimum value are excluded, and an arithmetic mean value of three results is determined as the Vickers hardness Hv of the Zn—Ni alloy plating layer 100.

[Lubricating Coating]

Figure 8:
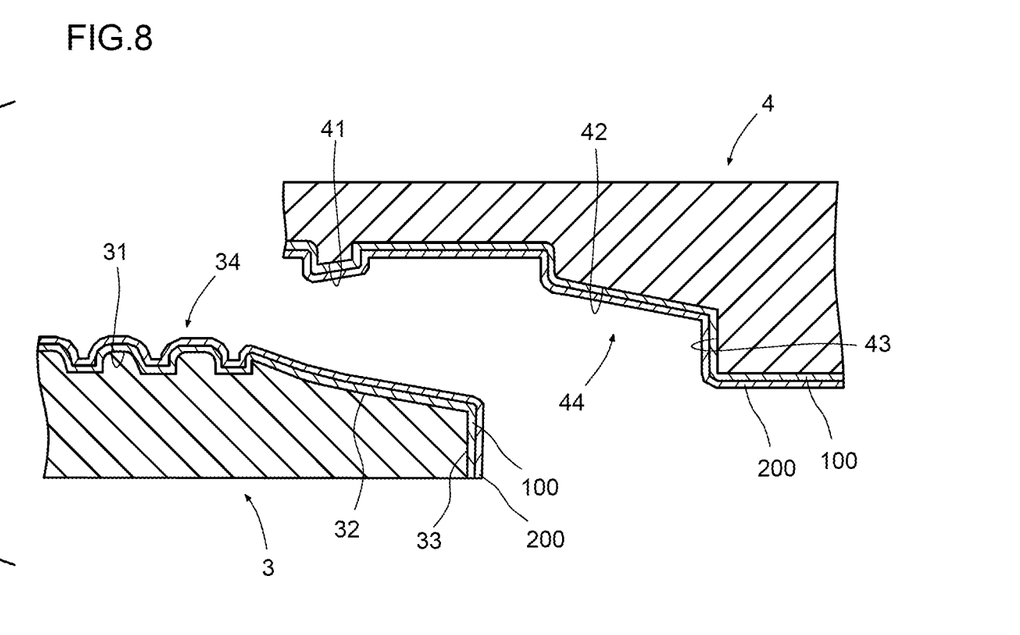
FIG. 8 is a sectional view of an example of a threaded connection for pipes according to the present embodiment in a case where its pin and box each include a lubricating coating.

The threaded connection for pipes according to the present embodiment exhibits an excellent galling resistance and an excellent high-torque maintenance property without a lubricating agent and suppresses the looseness. However, the threaded connection for pipes may further include a lubricating coating 200 on or above at least one selected from the group consisting of the pin contact surface 34, the box contact surface 44, and the Zn—Ni alloy plating layer 100. In this case, a lubricity of the threaded connection for pipes is increased. FIG. 8 is a sectional view of an example of the threaded connection for pipes according to the present embodiment in a case where its pin 3 and box 4 each include a lubricating coating. Referring to FIG. 8, the lubricating coating 200 may be disposed on both the Zn—Ni alloy plating layer 100 formed on the pin contact surface 34 and the Zn—Ni alloy plating layer 100 formed on the box contact surface 44. The disposition of the lubricating coating 20W is not limited to the disposition illustrated in FIG. 8.

Figure 9:
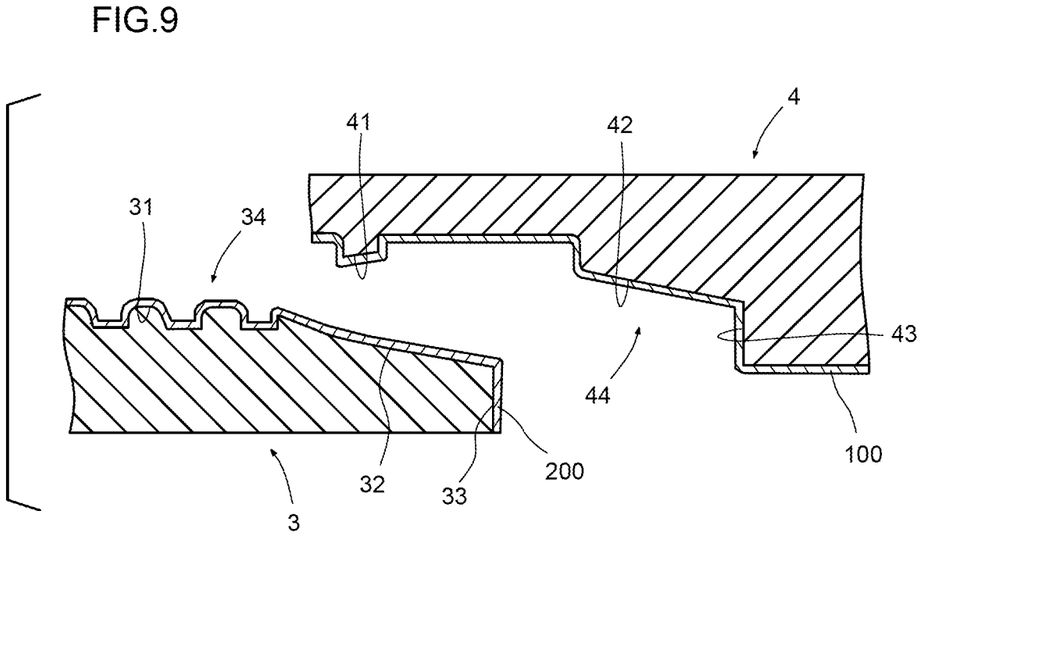
FIG. 9 is a sectional view of an example of a threaded connection for pipes according to another embodiment, the threaded connection for pipes being different from the threaded connection for pipes illustrated in FIG. 8.
Figure 10:
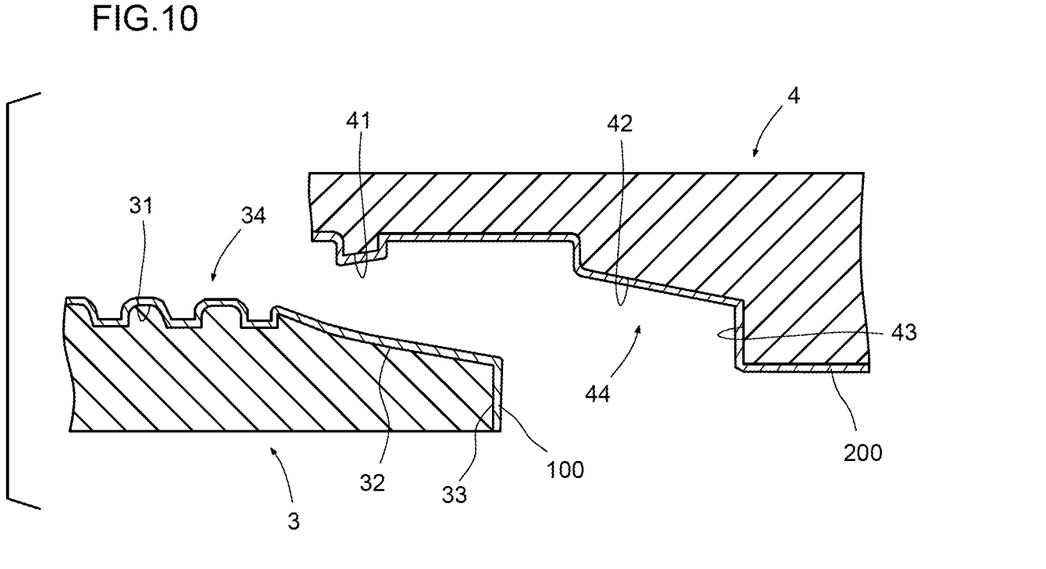
FIG. 10 is a sectional view of an example of a threaded connection for pipes according to still another embodiment, the threaded connection for pipes being different from the threaded connections for pipes illustrated in FIG. 8 and FIG. 9.

The lubricating coating 200 may be disposed only on or above the Zn—Ni alloy plating layer 100 formed on or above the pin contact surface 34. Also, the lubricating coating 200 may be disposed only on or above the Zn—Ni alloy plating layer 100 formed on or above the box contact surface 44. Alternatively, the lubricating coating 200 may be disposed directly on at least one of the pin contact surface 34 or the box contact surface 44. FIG. 9 is a sectional view of an example of the threaded connection for pipes according to another embodiment, the threaded connection for pipes being different from the threaded connection for pipes illustrated in FIG. 8. Referring to FIG. 9, the lubricating coating 200 may be disposed directly on the pin contact surface 34 where the Zn—Ni alloy plating layer 100 is not formed. FIG. 10 is a sectional view of an example of the threaded connection for pipes according to still another embodiment, the threaded connection for pipes being different from the threaded connections for pipes illustrated in FIG. 8 and FIG. 9. Referring to FIG. 10, the lubricating coating 200 may be disposed directly on the box contact surface 44 where the Zn—Ni alloy plating layer 100 is not formed.

Alternatively, the lubricating coating 200 may be disposed entirely on or above at least one selected from the group consisting of the pin contact surface 34, the box contact surface 44, and the Zn—Ni alloy plating layer 100. The lubricating coating 200 may be disposed only partially on or above at least one selected from the group consisting of the pin contact surface 34, the box contact surface 44, and the Zn—Ni alloy plating layer 100.

The lubricating coating 200 may be solid, or in a semisolid state or a liquid state. The semisolid form means a state which loss flowability in a static state, but which can acquire flowability when receiving a force (pressure, heat or the like) from the outside. The liquid form means a state which has a certain volume, but does not have a certain shape. The semisolid form or the liquid form includes a highly viscous substance, such as grease. As the lubricating coating 200, a well-known material having lubricity can be used. The well-known material having lubricity is not particularly limited, and for example, may be lubricating particle or may be lubricating agents which is not a particle. Also, the lubricating coating 200 may contain binder to forming the coating. The lubricating coating 200 may contain lubricating agent, solvent, or another kind of component as necessary.

As long as the particle has lubricity, the lubricating particle is not limited to a particular particle. Examples of the lubricating particle include one or more types selected from the group consisting of graphite, molybdenum disulfide ($MoS_2$), tungsten disulfide ($WS_2$), boron nitride (BN), polytetrafluoroethylene (PTFE), a graphite fluoride ($CF_x$), and calcium carbonate ($CaCO_3$). Examples of the lubricating agent which is not a particle include SEAL-GUARD (trademark) ECF (trademark) from JET-LUBE Inc. Other examples of the other lubricating agent include a lubricating agent that contains rosin, metallic soap, and wax.

Examples of the binder include one or two types selected from the group consisting of organic binder and inorganic binder. Examples of the organic binder include one or two types selected from the group consisting of thermosetting resin and thermoplastic resin. Examples of the thermosetting resin include one or more types selected from the group consisting of polyethylene resin, polyimide resin, and polyamide-imide resin. Examples of the inorganic binder include one or two types selected from the group consisting of compounds containing alkoxysilane linkage and siloxane linkage.

A chemical composition of the lubricating coating 200 disposed on or above the pin contact surface 34, a chemical composition of the lubricating coating 200 disposed on or above the box contact surface 44, and a chemical composition of the lubricating coating 200 disposed on or above the Zn—Ni alloy plating layer 100 may be the same or different from each other.

The thickness of the lubricating coating 200 is not limited to a specific thickness. The thickness of the lubricating coating 200 is, for example, 30 to 300 μm. When the thickness of the lubricating coating 200 is 30 μm or more, an effect of decreasing a torque value when the shoulder parts (the pin shoulder part 33 and the box shoulder part 43) come into contact with each other increases in fastening the threaded connection for pipes. This makes it easy to adjust the torque value in the fastening. Even when the thickness of the lubricating coating 200 becomes more than 300 μm, the above effect however levels off because a surplus of the lubricating coating 200 is removed from the pin contact surface 34 and the box contact surface 44 in the fastening.

In a case where the lubricating coating 200 is solid, the thickness of the lubricating coating 200 may be measured by the following method. A pin 3 or a box 4 that includes the lubricating coating 200 is prepared. The pin 3 or the box 4 is cut in a direction perpendicular to an axial direction. A cross section including the lubricating coating 200 is subjected to microscopic observation. A magnification of the microscopic observation is set at 500×. By this method, the thickness of the lubricating coating 200 is determined.

In a case where the lubricating coating 200 is liquid or semisolid, the thickness of the lubricating coating 200 can be measured by the following method. A arbitrary measurement spot of the pin 3 or box 4 of the threaded connection for pipes is identified. For example, a arbitrary measurement spot is identified from the pin metal seal part 32 or the box metal seal part 42. The identified measurement spot (area: 5 mm×20 mm) is wiped with ethanol-soaked absorbent cotton. An amount of application of the lubricating agent is calculated from a difference between a weight of the absorbent cotton before the wipe and a weight of the absorbent cotton after the wipe. From the amount of application of the lubricating agent, the density of the lubricating agent, and the area of the measurement spot, the average thickness of the lubricating coating 200 is calculated.

[Disposition of Zn—Ni Alloy Plating Layer and Lubricating Coating]

As described above, the disposition of the lubricating coating 200 is not particularly limited. Accordingly, on the condition that the Zn—Ni alloy plating layer 100 is disposed on or above at least one of the pin contact surface 34 or the box contact surface 44, and the lubricating coating 200 is disposed on or above at least one selected from the group consisting of the pin contact surface 34, the box contact surface 44, and the Zn—Ni alloy plating layer 100, combination of the dispositions is not limited. A case where only the Zn—Ni alloy plating layer 100 is provided is defined as a pattern 1. A case where the Zn—Ni alloy plating layer 100 is provided and the lubricating coating 200 is additionally provided on or above the Zn—Ni alloy plating layer 100 is defined as a pattern 2. A case where only the lubricating coating 200 is provided is defined as a pattern 3. A case where neither the Zn—Ni alloy plating layer 100 nor the lubricating coating 200 is provided is defined as a pattern 4.

Any one of the pattern 1 to 4 is possible for the pin contact surface 34 and the box contact surface 44 as long as the above condition is satisfied.

Specifically, in a case where the pin contact surface 34 follows the pattern 1 or 2, the box contact surface 44 can be in any one of the pattern 1 to 4. In a case where the pin contact surface 34 follows the pattern 3 or 4, the box contact surface 44 is in either the pattern 1 or 2. In contrast, in a case where the box contact surface 44 follows the pattern 1 or 2, the pin contact surface 34 can be in any one of the pattern 1 to 4. In a case where the box contact surface 44 follows the pattern 3 or 4, the pin contact surface 34 is in either the pattern 1 or 2.

[Base Metal of Threaded Connection for Pipes] A chemical composition of a base metal of the threaded connection for pipes is not limited to a specified chemical composition. Examples of the base metal include carbon steels, stainless steels, and alloy steels. Of the alloy steels, high alloy steels such as duplex stainless steels containing alloying elements such as Cr, Ni, and Mo, and Ni alloys have a high corrosion resistance. Therefore, by using these high alloy steels as the base metal, a corrosion resistance of the threaded connection for pipes is increased.

[Producing Method] A method for producing the threaded connection for pipes according to the present embodiment is a method for producing the threaded connection for pipes described above. The method for producing the threaded connection for pipes includes a preparing step and a plating layer forming step.

[Preparing Step]

In the preparation step, a pin 3, a box 4, and a plating solution are prepared. The pin 3 has the pin contact surface 34 including the external thread part 31, as described above. The box 4 has the box contact surface 44 including the internal thread part 41, as described above. At least one of the pin contact surface 34 and the box contact surface 44 may be subjected to well-known preparations. Examples of the preparations include degreasing. By the degreasing, oil, oil stain, and the like adhered on a surface of at least one of the pin contact surface 34 and the box contact surface 44 are removed. Examples of the degreasing include solvent degreasing, alkaline degreasing, and electrolytic degreasing. As the preparations, pickling may be additionally performed. By the pickling, rust, an oxidized coating formed during machining, and the like adhered on a surface of at least one of the pin contact surface 34 and the box contact surface 44 can be removed.

The plating solution contains a zinc ion, a nickel ion, and graphite. The plating solution is made to contain the zinc ion by dissolving a salt of zinc (e.g., zinc sulfate) in the plating solution. The plating solution is made to contain the nickel ion by dissolving a salt of nickel (e.g., nickel sulfate) in the plating solution. Examples of the anion of the salt of zinc and the salt of nickel include one or more types selected from the group consisting of sulfuric acid ion, chloride ion, and pyrophosphate ion. The plating solution preferably contains zinc ion: 1 to 100 g/L and nickel ion: 1 to 100 g/L.

The plating solution further contains graphite. Therefore, the Zn—Ni alloy plating layer 100 contains graphite. As a result, the galling resistance and the high-torque maintenance property of the Zn—Ni alloy plating layer 100 are increased, which suppresses the looseness of the threaded connection for pipes even when the threaded connection for pipes is used in a horizontal well. In the producing method according to the present embodiment, powdered graphite is preferably used. A particle size of the graphite is not limited to a specified particle size. The particle size of the graphite is, for example, 0.01 to 30 μm. With consideration given to dispersity in the plating solution and balance between the particle size and a thickness of the plating, a further preferable particle size of the graphite particle is 0.01 to 10 μm. The particle size of the graphite particle can be set as appropriate within a range within which the graphite particle can be dispersed in the plating solution and graphite is taken into the Zn—Ni alloy plating layer 100.

When a graphite content in the plating solution is 3 g/L or more, the graphite can be taken in the Zn—Ni alloy plating layer 100 in a stable manner. This enables the high-torque maintenance property of the Zn—Ni alloy plating layer 100 to be increased in a stable manner. In contrast, when the graphite content in the plating solution is 20 g/L or less, the graphite can be suppressed from precipitating in a plating bath. Therefore, the graphite content in the plating solution is preferably 3 to 20 g/L. A lower limit of the graphite content in the plating solution is more preferably 5 g/L. An upper limit of the graphite content in the plating solution is more preferably 10 g/L.

[Dispersant]

It is preferable that the plating solution further contains dispersant. The dispersant enhances a dispersity of the graphite in the plating solution. The dispersant is preferably one or two types selected from the group consisting of polyacrylic acid and 1-Butyl-1-methylpyrrolidinium chloride.

The polyacrylic acid is a polymer of acrylic acid. By dissolving the polyacrylic acid or a salt of the polyacrylic acid (e.g., sodium polyacrylate) in the plating solution, the polyacrylic acid is contained in the plating solution. The polyacrylic acid preferably has a low molecular weight. The polyacrylic acid of a low molecular weight can further enhance the dispersity of the graphite. An upper limit of the molecular weight of the polyacrylic acid is preferably 10000, more preferably 2000, in weight-average molecular weight. A lower limit of the molecular weight of the polyacrylic acid is not limited to a particular molecular weight. The lower limit of the molecular weight of the polyacrylic acid is, for example, 1000 in weight-average molecular weight.

The 1-Butyl-1-methylpyrrolidinium chloride (BMP) is a compound that is expressed as a chemical formula $C_9H_{20}ClN$, and that is classified as quaternary ammonium salt. The 1-Butyl-1-methylpyrrolidinium chloride is the compound that contains a five-membered ring (heterocycle containing N+). The 1-Butyl-1-methylpyrrolidinium chloride is also used as an ion liquid.

A content of the dispersant in the plating solution is not limited to a specific content. A small amount of the dispersant contained in the plating solution enhances the dispersity of the graphite. The content of the dispersant in the plating solution is, for example, $1\times10^{-1}$ to $1\times10^{-4}$ mol/L. In a case where the plating solution contains both the polyacrylic acid and the 1-Butyl-1-methylpyrrolidinium, a content of each is preferably $1\times10^{-6}$ to $1\times10^{-4}$ mol/L. The content of the polyacrylic acid (mol/L) means in molarity with respect to its weight average molecular weight.

The plating solution may contain one or more types selected from the group consisting of conducting salt, anodic dissolution promotor, complexing agent, pH buffer, surfactant, reducer, stabilizer, and other addition agents, as necessary.

[Plating Layer Forming Step]

In the plating layer forming step, at least one of the pin contact surface 34 and the box contact surface 44 is subjected to electroplating while brought into contact with the plating solution described above, so that the Zn—Ni alloy plating layer 100 is formed.

A plating apparatus includes, for example, a plating bath, an agitating device, a filter, a temperature regulator, an anode plate, and a rinsing device. The above plating solution is poured into the plating bath, and at least one of the pin 3 and the box 4 and the anode plate are immersed in the plating solution. Here, the entire pipe 1 or the entire coupling 2 may be immersed in the plating solution. The entire pin 3 may be immersed in the plating solution, or only the pin contact surface 34 of the pin 3 may be immersed in the plating solution. The entire box 4 may be immersed in the plating solution, or only the box contact surface 44 of the box 4 may be immersed in the plating solution. By energizing at least one of the pin contact surface 34 and the box contact surface 44, and the anode plate, the Zn—Ni alloy plating layer 100 is formed on or above at least one of the pin contact surface 34 and the box contact surface 44.

Conditions including a temperature in the plating bath, a current density, a pH, a rate of agitating can be set as appropriate. Conditions for the electroplating include, for example, the pH of the plating solution: 1 to 10, the temperature of the plating solution: 10 to 60° C., the current density: 1 to 100 A/dm$^2$, the rate of agitating: 0.1 to 1 m/sec, and a time period of the treatment: 1 to 100 minutes. After the plating layer forming step is completed, at least one of the pin contact surface 34 and the box contact surface 44 is rinsed and dried as necessary. A method for the rinsing and drying is not limited to a specific method.

[Lubricating Coating Forming Step]

The method for producing according to the present embodiment may further include a lubricating coating forming step. Specifically, after the aforementioned plating layer forming step, that is, after the Zn—Ni alloy plating layer 100 described above is formed on or above at least one of the pin contact surface 34 and the box contact surface 44, the lubricating coating forming step may be performed. In the lubricating coating forming step, a lubricating coating 200 is formed on or above at least one selected from the group consisting of the pin contact surface 34, the box contact surface 44, and the Zn—Ni alloy plating layer 100.

The lubricating coating 200 is formed by applying the lubricating agent described above to at least one selected from the group consisting of the pin contact surface 34, the box contact surface 44, and the Zn—Ni alloy plating layer 100. A method for the application is not limited to a specific method. Examples of the method for the application include spray application, brush application, and immersion. In a case where the spray application is adopted, the lubricating agent may be sprayed while being heated to increase in flowability. The lubricating coating 200 may be formed partially on or above at least one selected from the group consisting of the pin contact surface 34, the box contact surface 44, and the Zn—Ni alloy plating layer 100. However, the lubricating coating 200 is preferably formed entirely, uniformly on or above the pin contact surface 34, the box contact surface 44, and the Zn—Ni alloy plating layer 100.

Through the steps described above, the threaded connection for pipes according to the present embodiment is produced.

EXAMPLES

An Example will be described below. The symbol "%" in the Example means mass percent unless otherwise noted.

[Preparing Step]

In the present Example, a commercial cold-rolled steel sheet, which was assumed to be a base metal of a threaded connection, was used. The cold-rolled steel sheet measured 150 mm long×100 mm wide (plating surface measured 100 mm long×100 mm wide). The steel grade of the cold-rolled steel sheet was a low carbon steel. The chemical composition of the steel sheet was C: 0.19%, Si: 0.25%, Mn: 0.8%, P: 0.02%, S: 0.01%, Cu: 0.04%, Ni: 0.1%, Cr: 13%, Mo: 0.04%, and the balance: Fe and impurities.

A plating bath for Test Nos. 1 to 5 had the following composition.

Plating solution: DAIN Zinalloy (from Daiwa Fine Chemicals Co., Ltd.)
Graphite: TIMREX (trademark) KS6 (from IMERYS GRAPHITE & CARBON) 1 to 10 g/L, particle size<100 nm (D90)
Polyacrylic acid (from Sigma-Aldrich), $2 \times 10^{-5}$ mol/L, weight average molecular weight (Mw) 1800
1-Butyl-1-methylpyrrolidinium chloride (from Merck KGaA) $2 \times 10^{-5}$ mol/L A plating bath for Test Nos. 6 to 8 had the following composition.

Plating solution: copper sulfate pentahydrate 200 g/L, and sulfuric acid 50 g/L (from KISHIDA CHEMICAL Co., Ltd.)
Graphite: TIMREX (trademark) KS6 (from IMERYS GRAPHITE & CARBON) 1 to 10 g/L, particle size <100 nm (D90)
Polyacrylic acid (from Sigma-Aldrich), $2 \times 10^{-5}$ mol/L, weight average molecular weight (Mw) 1800
1-Butyl-1-methylpyrrolidinium chloride (from Merck KGaA) $2 \times 10^{-5}$ mol/L

[Plating Layer Forming Step]

On a steel sheet surface in each Test No., a plating layer was formed under the following conditions.

Plating bath temperature: 25° C.
Plating current density: 2 A/dm$^2$
Plating thickness (target value): 5 to 10 μm
Rate of agitating: 0.4 m/s
Plating anode (counter electrode): insoluble anode (iridium-oxide-coated Ti plate)

[Composition Measurement Test on Plating Layer]

For a steel sheet in each Test No, on which a plating layer was formed, a Ni content (at %) and a graphite content (at %) were measured by the method described above. In Test Nos. 6 to 8, element analysis was performed by EDS, and a proportion of C content was determined as the graphite content (at %), when a total content of Cu and C is 100.0 at %. Results of the measurement are shown in Table 1.

[Thickness Measurement Test on Plating Layer]

For a steel sheet in each Test No. on which a plating layer was formed, a thickness of the plating layer was measured by the method described above. Results of the measurement are shown in Table 1.

[Vickers Hardness Measurement Test on Plating Layer]

For a steel sheet in each Test No. on which a plating layer was formed, a Vickers hardness (Hv0.005) of a plating layer was measured by the method described above. Results of the measurement are shown in Table 1.

[Bowden Sliding Test]

For a steel sheet in each Test No. on which a plating layer was formed, the Bowden sliding test was conducted under the following conditions. In addition, changes in the coefficient of friction during the test are illustrated in FIG. 1, FIG. 11, and FIG. 12.

Steel ball: 3/16"SUJ2
Load: 3 kgf (Hertzian contact stress: average of 1.5 GPa)
Sliding width: 10 mm
Sliding speed: 4 mm/s
Lubricating agent: Absent (absence of oil)
Test temperature: Room temperature (25° C.)

Figure 11:
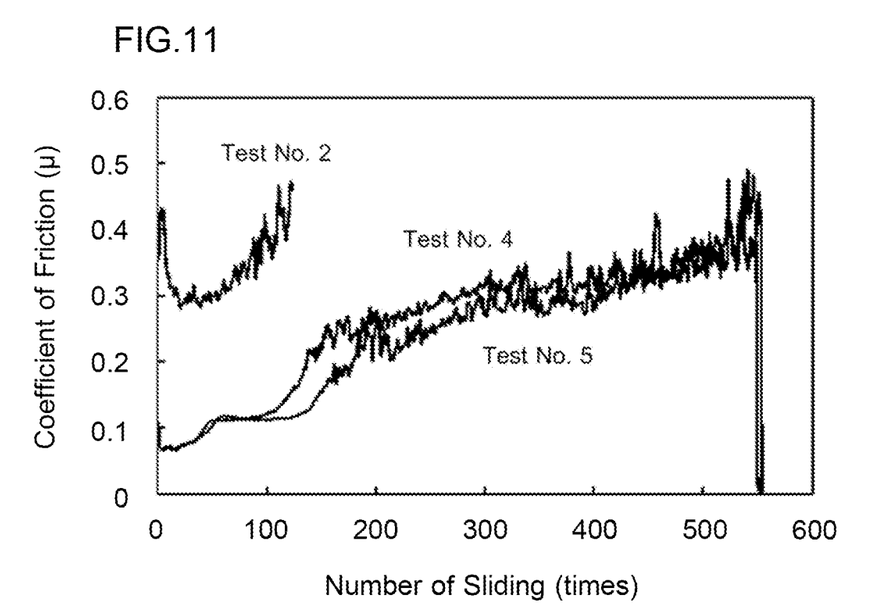
FIG. 11 is a diagram illustrating results of Bowden sliding test performed on Test Nos. 2, 4, and 5 in Example.
Figure 12:
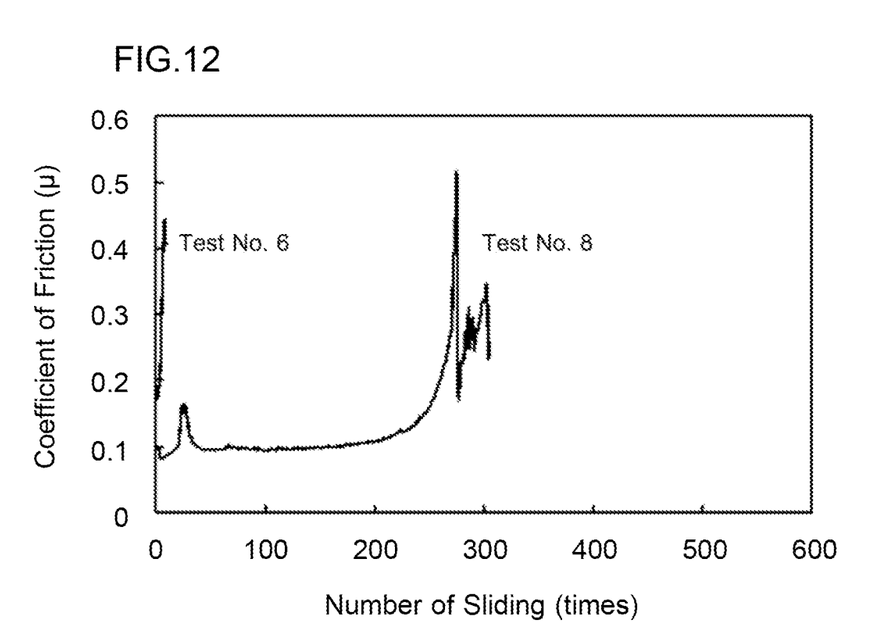
FIG. 12 is a diagram illustrating results of Bowden sliding test performed on Test Nos. 6 and 8 in Example.

FIG. 11 and FIG. 12 are diagrams each illustrating results of the Bowden sliding test performed in Example. Referring to FIG. 1, FIG. 11 and FIG. 12, when the number of sliding from the start of sliding until a coefficient of friction (p) exceeded 0.4 is large, it can be determined that the galling resistance of the steel sheet is excellent. Moreover, when the number of sliding until which a coefficient of friction (p) was kept 0.2 to 0.4 is large, it can be determined that the high torque maintenance property is excellent. Therefore, in the present Example, the number of sliding from the start of sliding until a coefficient of friction (p) exceeded 0.4 without galling occurring was determined as "total number of sliding". Further, the number of sliding until which a coefficient of friction (p) was kept 0.2 to 0.4 without galling occurring was determined as "number of sliding with high coefficient of friction". Obtained number of sliding with high coefficient of friction (times) and total number of sliding for a steel sheet in each Test No. are shown in Table 1.

[Results of Evaluation]

Referring to Table 1, FIG. 1, FIG. 11, and FIG. 12, the steel sheets in Test Nos. 2 to 5 included a Zn—Ni alloy plating layer containing graphite. As a result, the total numbers of sliding until a coefficient of friction (μ) exceeded 0.4 were more than 90 times, the steel sheets exhibited the excellent galling resistance. Further, the numbers of sliding with high coefficient of friction which kept coefficients of friction of 0.2 to 0.4 without galling occurring were more than 60 times, the steel sheets exhibited the excellent high-

TABLE 1

| Test No. | Kind of plating | Graphite concentration in plating solution (g/L) | Ni content (at %) | Graphite content (at %) | Plating Thickness (μm) | Vickers hardness (Hv0.005) | Number of sliding with high coefficient of friction (times) | Total number of sliding (times) |
|---|---|---|---|---|---|---|---|---|
| 1 | Zn—Ni | 0 | 15.2 | 0.0 | 9.6 | 405 | 12 | 13 |
| 2 | Zn—Ni | 1 | 14.7 | 2.7 | 8.8 | 386 | 97 | 98 |
| 3 | Zn—Ni | 3 | 15.6 | 32.8 | 7.1 | 392 | 152 | 211 |
| 4 | Zn—Ni | 5 | 27.5 | 46.0 | 6.9 | 380 | 386 | 523 |
| 5 | Zn—Ni | 10 | 24.4 | 53.7 | 5.1 | 375 | 342 | 522 |
| 6 | Cu | 0 | — | 0.0 | 10.5 | 157 | 2 | 6 |
| 7 | Cu | 10 | — | 43.8 | 11.7 | 112 | 51 | 314 |
| 8 | Cu | 10 | — | 65.0 | 10.3 | 38 | 30 | 273 | torque maintenance property. Therefore, the threaded connection for pipes including the Zn—Ni alloy plating layer containing graphite can be considered to be excellent in galling resistance and further insusceptible to loosen even when used for a horizontal well.

The steel sheets in Test Nos. 3 to 5, which had graphite contents of 30.0 to 60.0 at %. As a result, total numbers of sliding reached even larger in comparison with the steel sheet in Test No. 2, which had a graphite content of 2.7 at %, so that the steel sheets exhibited even more excellent galling resistance. Further, the steel sheets reached even larger numbers of sliding with high coefficient of friction in comparison with the steel sheet in Test No. 2, so that the steel sheets exhibited even more excellent high-torque maintenance properties. Therefore, the threaded connection for pipes including the Zn—Ni alloy plating layer containing 30.0 to 60.0 at % of graphite can be considered to be further excellent in galling resistance and further insusceptible to loosen even when used for a horizontal well.

In contrast, the steel sheet in Test No. 1 included the Zn—Ni alloy plating layer containing no graphite. As a result, the total number of sliding was 90 times or less, so that the steel sheet did not exhibit the excellent galling resistance. Further, the number of sliding with high coefficient of friction was 60 times or less, so that the steel sheet did not exhibit the excellent high-torque maintenance property.

The steel sheet in Test No. 6 included the Cu plating layer containing no graphite. As a result, the total number of sliding was 90 times or less, so that the steel sheet did not exhibit the excellent galling resistance. Further, the number of sliding with high coefficient of friction was 60 times or less, so that the steel sheet did not exhibit the excellent high-torque maintenance property.

The steel sheets in Test Nos. 7 and 8 included the Cu plating layer containing graphite. As a result, the total numbers of sliding were more than 90 times, so that the steel sheets exhibited the excellent galling resistance. However, the numbers of sliding with high coefficient of friction were 60 times or less, so that the steel sheets did not exhibit the excellent high-torque maintenance property.

As seen from the above, the embodiment according to the present disclosure has been described. However, the aforementioned embodiment is merely an example for practicing the present disclosure. Therefore, the present disclosure is not limited to the previously-mentioned embodiment, and the previously-mentioned embodiment can be modified and implemented as appropriate without departing from the scope of the present disclosure.

REFERENCE SIGNS LIST

1 steel pipe
2 coupling
3 pin
31 external thread part
32 pin metal seal part
33 pin shoulder part
34 pin contact surface
4 box
41 internal thread part
42 box metal seal part
43 box shoulder part
44 box contact surface
100 Zn—Ni alloy plating layer
200 lubricating coating

The invention claimed is:

1. A threaded connection for pipes, comprising:
   a pin having a pin contact surface that includes an external thread part;
   a box having a box contact surface that includes an internal thread part; and
   a Zn—Ni alloy plating layer disposed on or above at least one of the pin contact surface and the box contact surface, wherein
   the Zn—Ni alloy plating layer contains graphite.

2. The threaded connection for pipes according to claim 1, wherein
   when a content of a whole chemical composition of the Zn—Ni alloy plating layer is 100.0 at %,
   a Ni content in the Zn—Ni alloy plating layer is 5.0 to 35.0 at %.

3. The threaded connection for pipes according to claim 2, wherein
   when the content of the whole chemical composition of the Zn—Ni alloy plating layer is 100.0 at %,
   a graphite content in the Zn—Ni alloy plating layer is 30.0 to 60.0 at %.

4. The threaded connection for pipes according to claim 3, wherein a thickness of the Zn—Ni alloy plating layer is 1.0 to 50.0 μm.

5. The threaded connection for pipes according to claim 4, further comprising a lubricating coating on or above at least one selected from the group consisting of the pin contact surface, the box contact surface, and the Zn—Ni alloy plating layer.

6. The threaded connection for pipes according to claim 3, further comprising a lubricating coating on or above at least one selected from the group consisting of the pin contact surface, the box contact surface, and the Zn—Ni alloy plating layer.

7. The threaded connection for pipes according to claim 2, wherein a thickness of the Zn—Ni alloy plating layer is 1.0 to 50.0 μm.

8. The threaded connection for pipes according to claim 7, further comprising a lubricating coating on or above at least one selected from the group consisting of the pin contact surface, the box contact surface, and the Zn—Ni alloy plating layer.

9. The threaded connection for pipes according to claim 2, further comprising a lubricating coating on or above at least one selected from the group consisting of the pin contact surface, the box contact surface, and the Zn—Ni alloy plating layer.

10. The threaded connection for pipes according to claim 1, wherein
    when the content of the whole chemical composition of the Zn—Ni alloy plating layer is 100.0 at %,
    a graphite content in the Zn—Ni alloy plating layer is 30.0 to 60.0 at %.

11. The threaded connection for pipes according to claim 10, wherein a thickness of the Zn—Ni alloy plating layer is 1.0 to 50.0 μm.

12. The threaded connection for pipes according to claim 11, further comprising a lubricating coating on or above at least one selected from the group consisting of the pin contact surface, the box contact surface, and the Zn—Ni alloy plating layer.

13. The threaded connection for pipes according to claim 10, further comprising a lubricating coating on or above at least one selected from the group consisting of the pin contact surface, the box contact surface, and the Zn—Ni alloy plating layer.

14. The threaded connection for pipes according to claim 1, wherein a thickness of the Zn—Ni alloy plating layer is 1.0 to 50.0 μm.

15. The threaded connection for pipes according to claim 14, further comprising a lubricating coating on or above at least one selected from the group consisting of the pin contact surface, the box contact surface, and the Zn—Ni alloy plating layer.

16. The threaded connection for pipes according to claim 1, further comprising a lubricating coating on or above at least one selected from the group consisting of the pin contact surface, the box contact surface, and the Zn—Ni alloy plating layer.

17. A method for producing a threaded connection for pipes, the method comprising the steps of:
   preparing a pin having a pin contact surface that includes an external thread part; a box having a box contact surface that includes an internal thread part; and a plating solution containing a zinc ion, a nickel ion, and graphite; and
   forming a Zn—Ni alloy plating layer, by electrolytic plating, on at least one of the pin contact surface and the box contact surface by bringing at least one of the pin contact surface and the box contact surface into contact with the plating solution.

* * * * *